(12) United States Patent
McKelvey et al.

(10) Patent No.: US 6,979,914 B2
(45) Date of Patent: Dec. 27, 2005

(54) POWER GENERATING APPARATUS

(75) Inventors: Terence McKelvey, Tokyo (JP); Eishi Marui, Tokyo (JP); Masahiro Miyamoto, Tokyo (JP); Tai Furuya, Tokyo (JP); Tadashi Kataoka, Tokyo (JP); Motoyasu Sato, Fujisawa (JP); Seiichi Ishihara, Fujisawa (JP); Takahide Ozawa, Fujisawa (JP); Noboru Kinoshita, Fujisawa (JP); Shaojun Zheng, Fujisawa (JP)

(73) Assignees: Ebara Corporation, Tokyo (JP); Ebara Densan Ltd., Tokyo (JP)

( * ) Notice: Subject to any disclaimer, the term of this patent is extended or adjusted under 35 U.S.C. 154(b) by 131 days.

(21) Appl. No.: 10/781,687

(22) Filed: Feb. 20, 2004

(65) Prior Publication Data

US 2004/0222640 A1 Nov. 11, 2004

(30) Foreign Application Priority Data

Feb. 20, 2003 (JP) ............................. 2003-042806
Feb. 21, 2003 (JP) ............................. 2003-044825

(51) Int. Cl.$^7$ ............................. H02P 9/04; F02F 11/06
(52) U.S. Cl. ...................... 290/40 C; 290/52; 322/15
(58) Field of Search ..................... 290/40 R, 40 A, 290/40 C, 52; 322/14, 16

(56) References Cited

U.S. PATENT DOCUMENTS

| | | | |
|---|---|---|---|
| 4,119,861 A | 10/1978 | Gocho | |
| 5,055,764 A | 10/1991 | Rozman et al. | |
| 5,387,859 A | 2/1995 | Murugan et al. | |
| 5,428,275 A | 6/1995 | Carr et al. | |
| 5,512,811 A | 4/1996 | Latos et al. | |
| 5,581,168 A | 12/1996 | Rozman et al. | |
| 5,685,156 A | 11/1997 | Willis et al. | |
| 5,694,026 A | 12/1997 | Blanchet | |
| 5,703,410 A * | 12/1997 | Maekawa | 290/40 C |
| 5,783,932 A | 7/1998 | Namba et al. | |
| 5,903,116 A | 5/1999 | Geis et al. | |
| 5,966,001 A * | 10/1999 | Maehara et al. | 322/28 |
| 6,130,486 A * | 10/2000 | Shimizu et al. | 290/40 C |
| 6,323,625 B1 | 11/2001 | Bhargava | |
| 6,414,400 B1 * | 7/2002 | Scott et al. | 290/40 C |
| 6,541,876 B2 * | 4/2003 | Shimizu et al. | 290/40 A |
| 6,552,515 B2 * | 4/2003 | Shimizu et al. | 322/28 |
| 6,605,928 B2 | 8/2003 | Gupta et al. | |
| 6,624,528 B2 * | 9/2003 | Shimizu et al. | 290/40 C |
| 6,870,350 B2 * | 3/2005 | Garrigan et al. | 322/28 |

FOREIGN PATENT DOCUMENTS

WO  WO 02/052709   7/2002

* cited by examiner

Primary Examiner—Nicholas Ponomarenko
(74) Attorney, Agent, or Firm—Oblon, Spivak, McClelland, Maier & Neustadt, P.C.

(57) ABSTRACT

A power generating apparatus has a power generator 4 for generating AC power, a gas turbine engine 2 for driving the power generator 4, and an inverter device 5 for converting the AC power into commercial AC power. The power generating apparatus includes an interconnection switch $S_1$ for connecting an output of the inverter device 5 with a commercial AC power supply system, a first voltage detector 46 for detecting a DC power supply voltage Vdc-in of the inverter device 5, and a second voltage detector 33, 45 for detecting a full-wave rectification voltage of the commercial AC power supply system. The power generating apparatus also includes an interconnection control part 18 for closing the interconnection switch $S_1$ when the DC power supply voltage of the inverter device 5 exceeds the full-wave rectification voltage of the commercial AC power supply system.

10 Claims, 5 Drawing Sheets

POWER GENERATING APPARATUS

BACKGROUND OF THE INVENTION

1. Field of the Invention

The present invention relates to a small-sized power generating apparatus such as a gas turbine power generating apparatus, and more particularly to a method of operating such a power generating apparatus.

2. Description of the Related Art

Recently, the electric power market has been liberalized under deregulations of electric power. Accordingly, power supplies that can be locally distributed have been attracted considerable attention. Small-sized gas turbine power generating apparatuses have been employed as such power supplies. In the gas turbine power generating apparatus, fuel and compressed air are supplied to a gas turbine engine to rotate the gas turbine engine at an ultrahigh rotational speed of, for example, 100,000 rpm. When the gas turbine power generating apparatus is thus operated, a power generator, which is coupled directly to the gas turbine engine, generates alternating-current (AC) power having a frequency much higher than 50 Hz or 60 Hz of a commercial AC power supply system. Therefore, an output of the power generator is rectified into direct-current (DC) power by a rectification device, then converted into AC power having a frequency, a voltage, and a phase of the commercial AC power supply system by an inverter device, and sent to the commercial AC power supply system.

More specifically, a rotational speed of the power generator is increased at the time of starting of the power generating apparatus. Accordingly, an AC output voltage of the inverter device is also increased. When the AC output voltage of the inverter device becomes equal to a voltage of the commercial AC power supply system, a switch for connecting an output of the inverter device with the commercial AC power supply system is closed so as to send an output of power generation to the commercial AC power supply system.

FIG. 1 is a block diagram showing an interconnection device in a conventional power generating apparatus for connecting an output of the inverter device with the commercial power supply system. The interconnection device has a current detector (current transformer; CT) 231 connected to output terminals of an inverter 208 in the inverter device for detecting an output current of the inverter device, a filter circuit 234 connected to the current detector 231, and a voltage detector (potential transformer; PT) 232 connected to the filter circuit 234 for detecting an output voltage of the inverter device. The filter circuit 234 includes reactors and capacitors. The interconnection device also has an interconnection switch $S_1$ connected to the voltage detector 232, a voltage detector (potential transformer; PT) 233 connected to the interconnection switch $S_1$ for detecting a voltage of the commercial AC power supply system, a switch $S_2$ connected to the voltage detector 233, and terminals 210 for connecting the interconnection device with the commercial AC power supply system.

At the time of starting of the power generating apparatus, the switches $S_1$ and $S_2$ are opened. At the time of interconnection of the power generating apparatus and the commercial AC power supply system, the switch $S_2$ is first closed. Thus, a voltage waveform of the commercial AC power supply system is detected by the voltage detector 233. At that time, the inverter 208 controls its output voltage waveform, which is detected by the voltage detector 232, so as to be equal to the voltage waveform of the commercial AC power supply system. When these voltage waveforms accord with each other, the switch $S_1$ is closed so as to interconnect the power generating apparatus and the commercial AC power supply system via the filter circuit 234, which is disposed near the inverter 208 with respect to the interconnection switch $S_1$.

As shown in FIG. 2, the filter circuit 234 has a closed circuit including reactors L and capacitors C. Thus, an output waveform of the inverter 208 varies in phase and voltage depending upon properties of the filter circuit 234 to thereby produce a slight difference between a voltage waveform of the inverter 208 and a voltage waveform of the commercial power supply system. Accordingly, an inrush current is produced to cause a failure of interconnection.

As described above, in a conventional method of interconnecting the power generating apparatus and the commercial power supply system, an output voltage of the inverter device and a voltage of the commercial power supply system are detected by the voltage detectors 232 and 233, respectively, and the switches $S_1$ and $S_2$ are closed when these voltages accord with each other. However, it is difficult to precisely detect whether the voltages of the inverter device and the commercial power supply system are identical with each other. If the voltages of the inverter device and the commercial power supply system do not accord with each other, then an overcurrent may flow in power switching elements in the inverter device. Therefore, an overcurrent trip may occur and interfere with operation of the power generating apparatus.

Further, in a conventional power generating apparatus, when the gas turbine engine is to be started (or stopped), the power generator may be employed as a motor for the gas turbine engine by using an output of the inverter 208. However, actuation of the power generator is influenced by the filter circuit 234 because the filter circuit 234 cannot be separated from the inverter 208. Therefore, in order to eliminate the influence from the filter circuit 234, it is necessary to provide a mechanism for separating the filter circuit 234 or the capacitors C from the inverter 208.

SUMMARY OF THE INVENTION

The present invention has been made in view of the above drawbacks. It is, therefore, a first object of the present invention to provide a power generating apparatus which can stably connect an output of an inverter device with a commercial AC power supply system at the time of starting.

A second object of the present invention is to provide a method of operating such a power generating apparatus.

A third object of the present invention is to provide a power generating apparatus which has a filter circuit arranged so as not to interfere with operation of the apparatus when the apparatus is to be started or stopped.

In order to attain the first object, according to a first aspect of the present invention, there is provided a power generating apparatus having a power generator for generating AC power, a driving source for driving the power generator, and an inverter device for converting the AC power into commercial AC power. The power generating apparatus includes an interconnection switch for connecting an output of the inverter device with a commercial AC power supply system, a first voltage detector for detecting a DC power supply voltage of the inverter device, and a second voltage detector for detecting a full-wave rectification voltage of the commercial AC power supply system. The power generating apparatus also includes an interconnection control part for closing or throwing the interconnection switch when the DC power supply voltage of the inverter device becomes equal to or exceeds the full-wave rectification voltage of the commercial AC power supply system.

Thus, when the DC power supply voltage of the inverter device becomes equal to or exceeds the full-wave rectification voltage of the commercial AC power supply system, the interconnection switch is closed at the time of stating of the power generator. Accordingly, no current flows from the commercial power supply system into the inverter device even if the interconnection switch is closed. Therefore, no overcurrent flows in power switching elements of the inverter device from the commercial power supply system, and no overcurrent trip occurs. Thus, operation of interconnection can smoothly be performed.

According to a second aspect of the present invention, there is provided a power generating apparatus a power generator for generating AC power, a driving source for driving the power generator, and an inverter device for converting the AC power into commercial AC power. The power generating apparatus includes an interconnection switch for connecting an output of the inverter device with a commercial AC power supply system, a filter circuit connected between the inverter device and the commercial AC power supply system, and a first voltage detector for detecting an output voltage of the inverter device. The filter circuit comprises a reactor and a capacitor. The power generating apparatus also includes an active filter connected to the first voltage detector, a second voltage detector for detecting a voltage of the commercial AC power supply system, and an interconnection control part for closing or throwing the interconnection switch when an output of the active filter accords with an output of the second voltage detector. The active filter has simulated properties of the filter circuit.

Thus, after the power generating apparatus is started, an output voltage of the inverter device is inputted through the active filter having simulated properties of the filter circuit, which comprises a reactor, into the interconnection control part. Accordingly, an output voltage waveform of the inverter device that will be outputted from the filter circuit can be detected in a state in which the interconnection switch is opened. A voltage PID control is performed so that the voltage waveform accords with the voltage of the commercial power supply system, and then the interconnection switch is closed. Thus, stable operation of interconnection can be performed.

According to a preferred aspect of the present invention, the power generating apparatus further comprises a boost control part for boosting the DC power supply voltage of the inverter device so as to exceed the full-wave rectification voltage of the commercial AC power supply system.

It is desirable that the driving source comprises a gas turbine engine. It is also desirable that the power generator comprises a permanent-magnet-type generator having a permanent magnet mounted on a circumferential surface of a rotor.

In order to attain the second object, according to a third aspect of the present invention, there is provided a method of operating a power generating apparatus. According to this method, a power generator is driven to generate AC power. The AC power is converted into commercial AC power by an inverter device. A DC power supply voltage of the inverter device is detected, and a full-wave rectification voltage of a commercial AC power supply system is detected. An output of the inverter device is connected with the commercial AC power supply system based on the DC power supply voltage of the inverter device and the full-wave rectification voltage of the commercial AC power supply system.

According to a fourth aspect of the present invention, there is provided a method of operating a power generating apparatus. According to this method, a power generator is driven to generate AC power. The AC power is converted into commercial AC power by an inverter device. An output voltage of the inverter device is detected, and a voltage of the commercial AC power supply system is detected. The output voltage of the inverter device is inputted into an active filter having simulated properties of a filter circuit to generate a simulated output voltage of the filter circuit. The filter circuit is connected between the inverter device and the commercial AC power supply system. The filter circuit comprises a reactor and a capacitor. An output of the inverter device is connected with the commercial AC power supply system when the simulated output voltage of the filter circuit accords with the voltage of the commercial AC power supply system.

In order to attain the third object of the present invention, according to a fifth aspect of the present invention, there is provided a power generating apparatus having a power generator for generating AC power, a driving source for driving the power generator, and an inverter device for converting the AC power into commercial AC power. The power generating apparatus includes an interconnection switch for connecting an output of the inverter device with a commercial AC power supply system and a filter circuit connected to the interconnection switch. The filter circuit comprises a reactor and a capacitor and is disposed between the interconnection switch and the commercial AC power supply system. The power generating apparatus also includes an interconnection control part for closing the interconnection switch to connect the output of the inverter device with the commercial AC power supply system.

According to the present invention, when the interconnection control part does not perform interconnection of the power generating apparatus and the commercial AC power supply system, for example, during a starting period until the driving source can be operated on its own only by fuel or when the driving source is stopped, an output of the inverter device can be separated from the filter circuit by the interconnection switch because the filter circuit is disposed between the interconnection switch and the commercial power supply system. Therefore, the power generator can be employed as a motor by using the output of the inverter device without influence of the filter circuit when the driving source is to be started or stopped.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

A power generating apparatus according to embodiments of the present invention will be described below with reference to FIG. 3 through 7.

Figure 3:
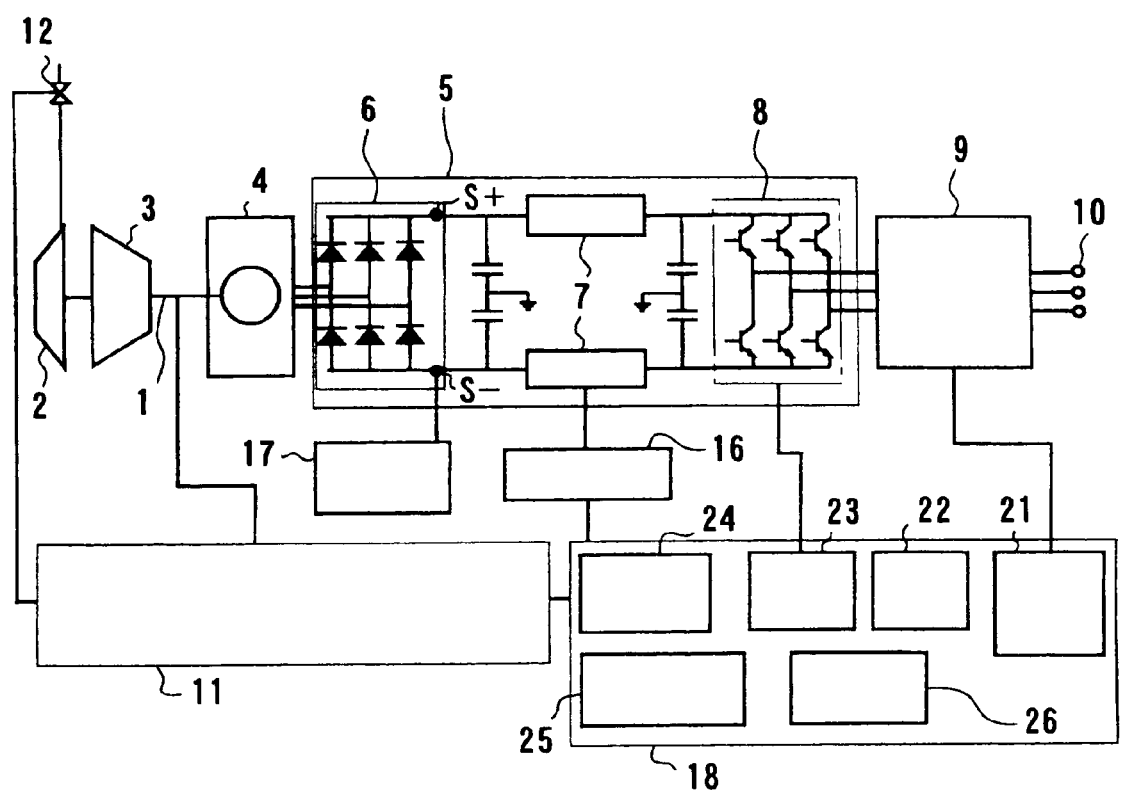
FIG. 3 is a block diagram showing a gas turbine power generating apparatus according to a first embodiment of the present invention.

FIG. 3 is a block diagram showing a gas turbine power generating apparatus according to a first embodiment of the present invention. The gas turbine power generating apparatus can generate a large amount of electric power with a compact structure by ultrahigh-speed rotation of a gas turbine engine and a power generator coupled directly to the gas turbine engine. The gas turbine power generating apparatus has a rotational shaft 1, a gas turbine rotor 2 attached to the rotational shaft 1, a compressor rotor 3 attached to the rotational shaft 1, and a power generator 4. Specifically, the gas turbine power generating apparatus includes a gas turbine engine (driving source) having the gas turbine rotor 2, which is rotated at an ultrahigh rotational speed by combustion of a mixture of air and fuel, and a compressor for compressing air to be supplied to the gas turbine rotor 2. The power generator 4 comprises a permanent-magnet-type generator having a rotor and a stator disposed around the rotor. The gas turbine engine, the compressor, and the power generator are formed integrally with each other.

The gas turbine power generating apparatus also includes a combustor (not shown) provided in the gas turbine engine for generating a combustion gas, a fuel control valve 12 for controlling an amount of fuel to be supplied to the combustor, and a fuel supply device (not shown) for supplying liquid fuel or gas fuel through the fuel control valve 12 to the combustor. The fuel is mixed with compressed air, which is compressed by the compressor and combusted in the combustor to rotate the gas turbine rotor 2. Combustion exhaust gas which has passed through the gas turbine rotor 2 exchanges heat with compressed air, which is compressed by the compressor, in a regenerator (not shown) and is then discharged to the exterior of the apparatus. The compressed air that has been preheated in the regenerator is mixed with the fuel and combusted in the combustor to rotate the gas turbine rotor 2 at a high rotational speed. Thus, the gas turbine power generating apparatus can generate a large amount of electric power with a compact structure.

As shown in FIG. 3, the gas turbine power generating apparatus has an inverter device 5 including a rectifier (full-wave rectifier) 6 for rectifying an output of the power generator 4 into direct current, a booster 7 for boosting the rectified DC voltage, and an inverter 8 for converting the boosted voltage into AC power having the same frequency, voltage, and phase as those of a commercial AC power supply system. The gas turbine power generating apparatus also has an interconnection device 9 for connecting an output of the inverter device 5 with the commercial AC power supply system. Thus, an output of the inverter device 5 is sent through the interconnection device 9 from output terminals 10 to the commercial power supply system The gas turbine power generating apparatus also includes an engine control part 11 for controlling, for example, an opening of the fuel control valve 12 at the time of starting and steady operation, and an inverter control part 18 for controlling, for example, operation of the inverter device 5 at the time of starting and steady operation and timing of interconnection in the interconnection device 9. The power generator 4 can be employed as a motor at the time of starting. In such a case, AC power is supplied from a battery through the inverter device 5 to increase the rotational speed of the rotational shaft 1 to a predetermined value, and then the combustor is ignited to start the gas turbine engine.

As described above, the power generator 4 in the present embodiment comprises a permanent-magnet-type generator having permanent magnets mounted on a circumferential surface of a rotor. The power generator 4 has a stator disposed around the circumferential surface of the rotor. With such a permanent-magnet-type generator, an induced voltage generated by rotation of the rotor is outputted from windings of the stator, and no current loss occurs in the rotor. Thus, a permanent-magnet-type generator is suitable for operation at a high rotational speed and can achieve an excellent generating efficiency.

Electric power is generated by the power generator 4 coupled directly to the rotational shaft 1 of the gas turbine rotor 2, which is rotated at a high rotational speed. In the inverter device 5, the generated electric power is rectified into direct current by the rectifier 6, and the direct current is boosted by the booster 7. The DC voltage is converted into AC power having the same frequency, voltage, and phase as those of the commercial AC power supply system. Thus, an output of the inverter device 5 is sent through the interconnection device 9 and the terminals 10 to the commercial power supply system.

The inverter control part 18 includes a voltage/current detector 21 for detecting a voltage of the commercial power supply system, an output current of the inverter device 5, and the like, a PID control circuit 22, a pulse width modulation (PWM) control part 23 for controlling power switching elements such as insulated gate bipolar transistors (IGBT) in the inverter 8 with pulse width modulation, a switch control part 24 for controlling opening and closing of various switches, a starting control part 25 for controlling starting of the power generating apparatus, and an interconnection control part 26 for controlling timing of interconnection of the power generating apparatus and the commercial power supply system.

As shown in FIG. 3, the gas turbine power generating apparatus has a boost control part 16 for controlling a DC voltage in the booster 7, which comprises a DC/DC converter, and a DC voltage control part 17 for actuating the power generator 4 as a motor at the time of starting of the gas turbine power generating apparatus.

Figure 4:
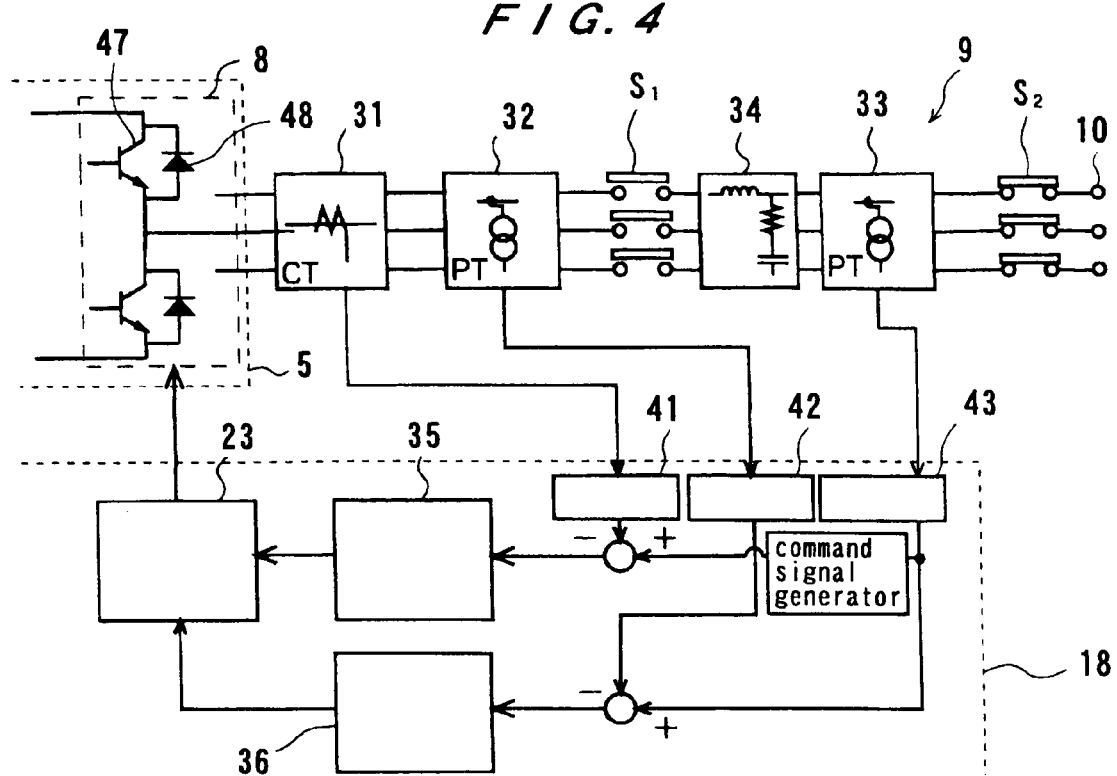
FIG. 4 is a block diagram showing an interconnection device and an inverter control part in the gas turbine power generating apparatus shown in FIG. 3.

FIG. 4 is a block diagram showing the interconnection device 9 and the inverter control part 18. The interconnection device 9 has a current detector (current transformer; CT) 31 connected to output terminals of the inverter device 5 for detecting an output current of the inverter device 5, a voltage detector (potential transformer; PT) 32 connected to the current detector 31 for detecting a voltage of the inverter device 5, an interconnection switch $S_1$ connected to the voltage detector 32, a filter circuit 34 connected to the interconnection switch $S_1$, a voltage detector (potential transformer; PT) 33 connected to the filter circuit 34 for detecting a voltage of the commercial AC power supply system, and a switch $S_2$ connected to the voltage detector 33. These components are provided between the output terminals of the inverter device 5 and the terminals 10 to be connected to the commercial power supply system. The switches $S_1$ and $S_2$ are used to connect an output of the power generating apparatus with the commercial power supply system. The current detector 31 is connected to a current detection circuit 41 in the inverter control part 18. The voltage detectors 32 and 33 are connected to voltage detection circuits 42 and 43 in the inverter control part 18, respectively.

In the interconnection device 9, the switches $S_1$ and $S_2$ are opened at the time of starting. At the time of interconnection, the switches $S_1$ and $S_2$ are closed so as to output an output current of the inverter device 5 to the commercial power supply system in a state such that the output current of the inverter device 5 is in phase with a voltage of the commercial power supply system, i.e. a power factor is 1.

After the power generating apparatus has been started, the switch $S_2$ is first closed for interconnection. Thus, a voltage waveform of the commercial power supply system is detected by the voltage detector 33. The inverter control part 18 controls the inverter 8 so as to output the same voltage waveform as that of the commercial power supply system.

Specifically, the inverter control part 18 has a voltage PID control circuit 36 for controlling the inverter device 5 so that a waveform of an output voltage signal of the inverter device 5 accords with a waveform of a voltage signal of the commercial power supply system at the time of interconnection. More specifically, the voltage PID control circuit 36 feeds back a voltage of the commercial power supply system, which is detected by the voltage detector 33, to a voltage of the inverter device 5, which is detected by the voltage detector 32, in a state such that the switch $S_1$ is opened and the switch $S_2$ is closed. As a result, an output voltage of the inverter device 5 is increased. When the output voltage of the inverter device 5 accords with the voltage of the commercial power supply system, the interconnection control part 26 in the inverter control part 18 closes or throws the interconnection switch $S_1$ to interconnect the inverter device 5 and the commercial power supply system.

Figure 5:
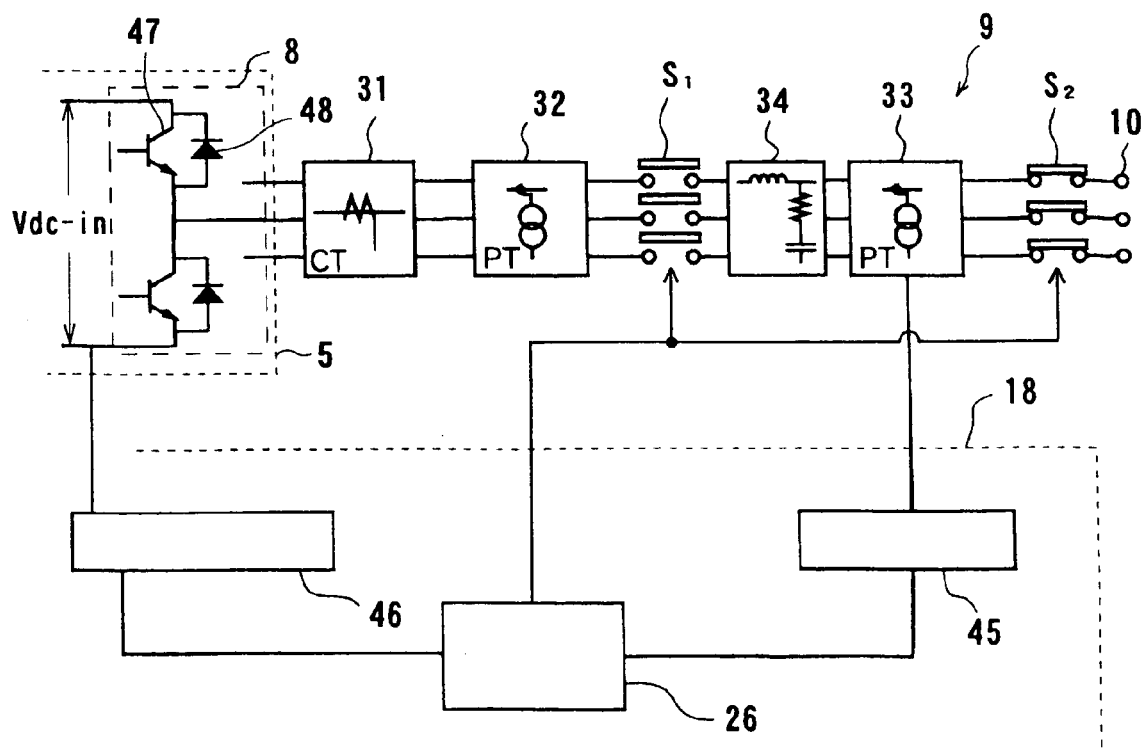
FIG. 5 is a block diagram showing the interconnection device and the inverter control part in the gas turbine power generating apparatus shown in FIG. 3.

In the present embodiment, as shown in FIG. 5, the inverter control part 18 has a full-wave rectification circuit 45 connected to the voltage detector 33, which detects a voltage of the commercial power supply system. The full-wave rectification circuit 45 performs full-wave rectification on a detected AC voltage of the commercial power supply system and outputs a DC voltage equivalent to the AC voltage of the commercial power supply system. The equivalent DC voltage (full-wave rectification voltage) is inputted into the interconnection control part 26. Specifically, the full-wave rectification voltage of the commercial power supply system can be detected by the voltage detector 33 and the full-wave rectification circuit 45.

As shown in FIG. 5, the inverter control part 18 also has a DC voltage detection circuit 46 for detecting a DC power supply voltage (Vdc-in) of the inverter 8. As shown in FIG. 5, the DC power supply voltage (Vdc-in) is defined as a voltage applied between both ends of pairs of a power switching element 47 and a diode 48 connected in parallel. The interconnection control part 26 compares the DC voltage equivalent to the voltage of the commercial power supply system (i.e. full-wave rectification voltage) with the DC power supply voltage (Vdc-in) of the inverter device 5. Then, the interconnection control part 26 closes or throws the interconnection switch $S_i$ when the DC power supply voltage (Vdc-in) of the inverter device 5 exceeds the DC voltage equivalent to the voltage of the commercial AC power supply system (full-wave rectification voltage).

The inverter 8 has pairs of a power switching element 47 and a diode 48 connected in parallel. Specifically, the inverter 8 has diodes connected in the same manner as in the full-wave rectification circuit 45. After starting of the power generating apparatus, the rotational speed of the rotational shaft 1 of the gas turbine engine is increased, and the output of the power generator 4 is accordingly increased. When the DC power supply voltage of the inverter device 5 is higher than the full-wave rectification voltage of the commercial power supply system, no current flows from the commercial power supply system into the inverter device 5 even if the interconnection switch $S_1$ is closed. With a conventional power generating apparatus, an abnormal current would momentarily flows in the power switching elements 47 of the inverter device 5 to cause an overcurrent trip because an output AC voltage of the inverter device 5 would not accord precisely with an AC voltage of the commercial power supply system if the interconnection switch $S_1$ is closed. However, the power generating apparatus according to the present invention does not raise such problems.

Next, operation of interconnection will be described below. The switches $S_1$ and $S_2$ are opened at an initial condition. Then, the switch $S_2$ is first closed. At that time, the boost control part 16 controls the booster 7 in the inverter device 5 so as to supply a DC voltage suitable for interconnection to the inverter 8. Specifically, an AC output voltage of the power generator 4 operated at a rated rotational speed is converted into a DC voltage by the rectifier (full-wave rectification circuit) 6 and boosted to a DC power supply voltage suitable for interconnection by the booster 7, which is controlled by the boost control part 16.

The PWM control part 23 controls the voltage of the inverter 8 so that the inverter device 5 produces an output voltage waveform having the same voltage, frequency, and phase as those in the commercial power supply system. At that time, a voltage waveform .of the commercial power supply system is detected through the voltage detector 33 by the voltage detection circuit 43 in the inverter control part 18. On the other hand, an output voltage waveform of the inverter device 5 is detected through the voltage detector 32 by the voltage detection circuit 42 in the inverter control part 18. A voltage signal of the commercial power supply system is inputted as a command signal into the voltage PID control circuit 36 while the voltage signal of the output of the inverter device 5 is inputted as a feedback signal into the voltage PID control circuit 36. The PWM control part 23 controls switching of the power switching elements 47 with pulse width modulation based on the signal from the voltage PID control circuit 36. Accordingly, the inverter device 5 outputs a voltage waveform which accords with a voltage waveform of the commercial power supply system. In this state, when the interconnection switch $S_1$ is closed, the inverter device 5 and the commercial power supply system are interconnected. As soon as the interconnection switch $S_1$ is closed, the PWM control part 23 switches connection to a current PID control part 35.

Figure 6:
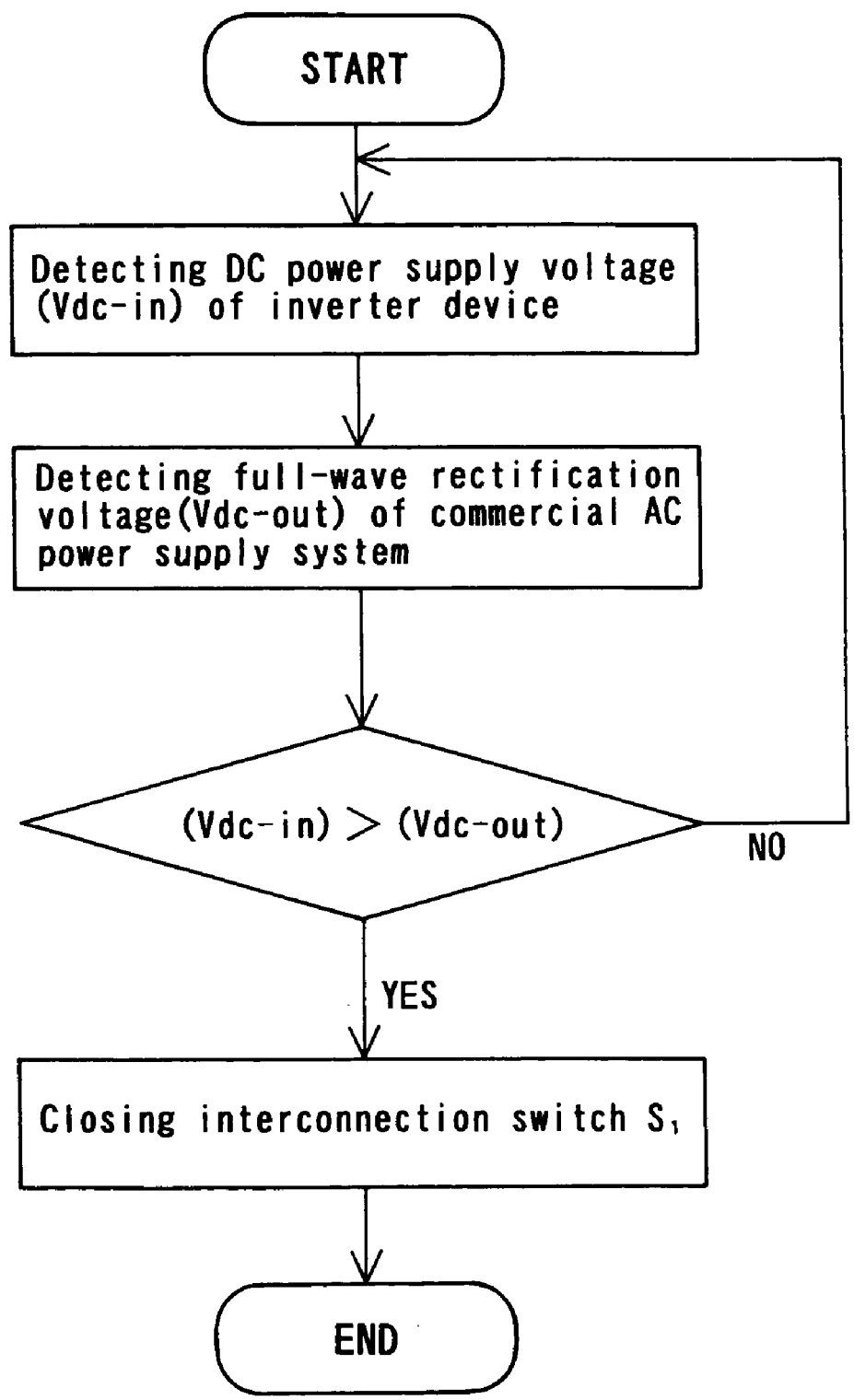
FIG. 6 is a flow chart showing operation of interconnection in the first embodiment.

Specifically, operation of interconnection is performed according to a flow chart shown in FIG. 6. First, a DC power supply voltage (Vdc-in) of the inverter device 5 and a full-wave rectification voltage (Vdc-out) of the commercial AC power supply system are detected and compared with each other. When Vdc-in is larger than Vdc-out (Vdc-in>Vdc-out), the interconnection switch $S_1$ is closed. If Vdc-in is smaller than Vdc-out (Vdc-in<Vdc-out), then the interconnection control part 26 awaits an increase of the DC power supply voltage (Vdc-in) of the inverter device 5 until Vdc-in becomes larger than Vdc-out (Vdc-in>Vdc-out). After Vdc-in becomes larger than Vdc-out (Vdc-in>Vdc-out), the interconnection switch $S_1$ is closed.

The above determination routine allows stable operation of interconnection to be performed. Specifically, the inverter device 5 has diodes 48 connected in parallel to power switching elements 47. Thus, as viewed from output terminals of the inverter device 5, such a circuit in the inverter device 5 can be considered as a full-wave rectification circuit. When the interconnection switch $S_1$ is closed, the DC power supply voltage of the inverter device 5 is higher than the full-wave rectification voltage of the commercial power supply system. Therefore, no overcurrent flows in the power switching elements 47 from the commercial power supply system, and no overcurrent trip occurs.

When the output power of the power generator 4 is to be sent to the commercial power supply system, a desired power (or a desired current) is set in the inverter control part 18. The current detector 31 detects an output current of the inverter device 5. The inverter device 5 is controlled with pulse width modulation by the current PID control part 35 in the inverter control part 18 so that the output current of the inverter device 5 accords with the desired current. Accordingly, the amount of fuel to be supplied to the gas turbine engine is increased by the engine control part 11 to increase the output power of the power generating apparatus. Thus, power can be sent from the power generating apparatus so as to conform with the power of the commercial power supply system. Operation of interconnection of the power generating apparatus and the commercial power supply system is thus completed.

In the present embodiment, the interconnection switch $S_1$ is closed when the DC power supply voltage of the inverter device 5 exceeds the full-wave rectification voltage of the commercial power supply system. However, the interconnection switch $S_1$ may be closed when the DC power supply voltage of the inverter device 5 becomes equal to the full-wave rectification voltage of the commercial power supply system.

In the present embodiment, the power generator 4 can be employed as a motor at the time of starting, as described above. Specifically, when the interconnection control part 18 does not perform interconnection of the power generating apparatus and the commercial AC power supply system, an output of the inverter device 5 can be separated from the filter circuit 34 by the interconnection switch $S_1$ because the filter circuit 34 is disposed between the interconnection switch $S_1$ and the commercial power supply system. Therefore, the power generator 4 can be employed as a motor by using the output of the inverter device 5 without influence of the filter circuit 34 when the gas turbine engine is to be started or stopped.

As described above, according to the present embodiment, an overcurrent trip is prevented from being caused at the time of interconnection, and stable operation of interconnection can be achieved.

Figure 7:
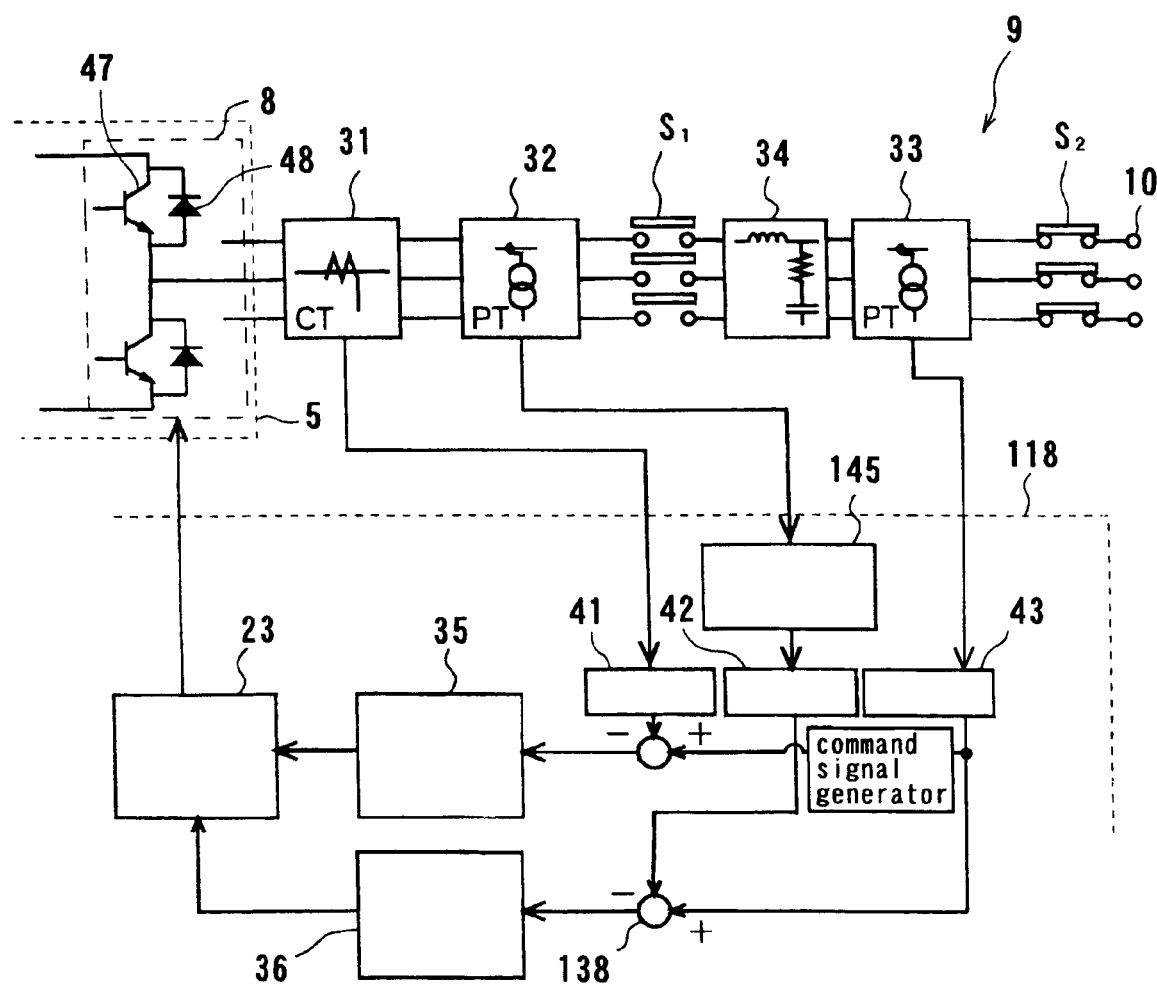
FIG. 7 is a block diagram showing an interconnection device and an inverter control part in a power generating apparatus according to a second embodiment of the present invention.

FIG. 7 is a block diagram showing an interconnection device 9 and an inverter control part 118 in a gas turbine power generating apparatus according to a second embodiment of the present invention. In FIG. 7, like or corresponding parts are designated by the same reference numerals as those in the first embodiment and will not be described repetitively.

Figure 1:
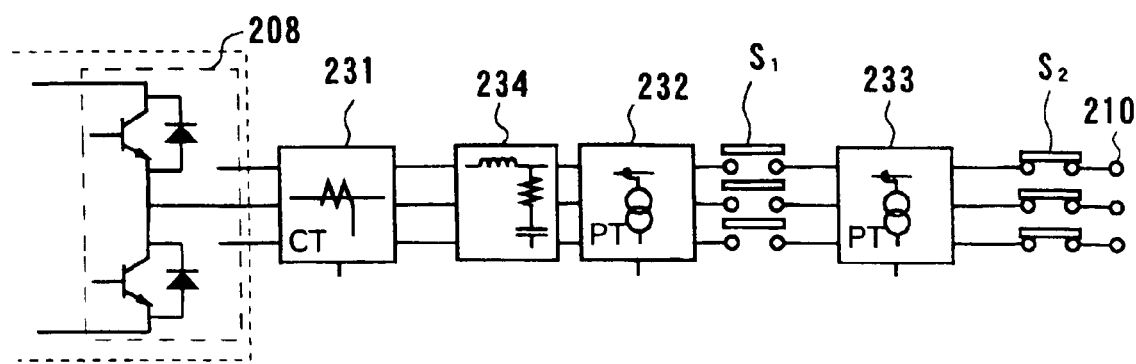
FIG. 1 is a block diagram showing an interconnection device in a conventional power generating apparatus.
Figure 2:
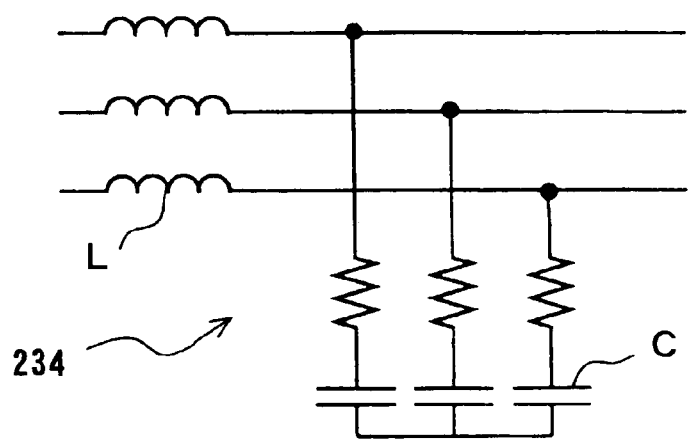
FIG. 2 is a circuit diagram showing a filter circuit in an interconnection device in a power generating apparatus.

As shown in FIG. 7, the inverter control part 118 has an active filter 145 connected to a voltage detector 32 (potential transformer; PT). Thus, a voltage detected by the voltage detector 32 is inputted through the active filter 145 into a voltage detection circuit 42 in the inverter control part 118. As shown in FIG. 7, the interconnection device 9 has a filter circuit 34, which comprises reactors L and capacitors C (see FIG. 2), connected to an interconnection switch $S_1$, a voltage detector (potential transformer; PT) 33, which is connected to the filter circuit 34, for detecting a voltage of a commercial AC power supply system, and terminals 10 connected via a switch $S_2$ for connecting the interconnection device 9 with the commercial power supply system. With the interconnection device 9, an output of the inverter device 5 is connected via the terminals 10 with the commercial power supply system.

The active filter 145 has simulated properties of the filter circuit 34. Thus, even if the interconnection switch $S_1$ is opened, the active filter 145 can output a voltage detection signal (simulated output voltage) equivalent to an output of the filter circuit 34 in a case where the interconnection switch $S_1$ is closed. Accordingly, a voltage waveform that will be outputted from the filter circuit 34 when the interconnection switch $S_1$ is closed can be simulated in a state in which the interconnection switch $S_1$ is opened. The properties of the active filter 145 can readily be adjusted with use of commercially available semiconductor ICs. The active filter 145 is mounted on a printed circuit board, on which the inverter control part 118 formed.

For interconnection, the switch $S_2$ is first closed while the switch $S_1$ is opened. Thus, a voltage of the commercial power supply system is detected by the voltage detector 33. An output voltage of the inverter 8 is detected through the active filter 145 by the voltage detector 32. As described above, the active filter 145 has simulated properties of the filter circuit 34. Accordingly, a voltage waveform that will be outputted from the filter circuit 34 when the interconnection switch $S_1$ is closed can be obtained from an output of the active filter 145. The voltage signals from the voltage detection circuits 42 and 43 are compared with each other by a comparator 138. Thus, the output voltage of the inverter 8 can be controlled via a voltage PID control circuit 36 and a PWM control part 23 so that an output voltage of the filter circuit 34 accords with an voltage of the commercial power supply system. After it is confirmed that an output of the filter 34 which is simulated from an output voltage of the inverter device 5 accords with the voltage of the commercial power supply system, the interconnection switch $S_1$ is closed. Thus, the voltage of the inverter device 5 can accord with the voltage of the commercial power supply system. Therefore, an inrush current is prevented from being produced, and stable operation of interconnection can be performed.

When the output power of the power generator 4 is to be sent to the commercial power supply system, a desired power (or a desired current) is set in the inverter control part 118. The current detector 31 detects an output current of the inverter device 5. The inverter device 5 is controlled with pulse width modulation by the current PID control part 35 in the inverter control part 18 so that the output current of the inverter device 5 accords with the desired current. Accordingly, the amount of fuel to be supplied to the gas turbine engine is increased by the engine control part 11 to increase the output power of the power generating apparatus. Thus, power can be sent from the power generating apparatus so as to conform with the power of the commercial power supply system. Operation of interconnection of the power generating apparatus and the commercial power supply system is thus completed.

Instead of the voltage detector 32, a combination of a DC voltage detection circuit 46 of the inverter device 5 (see FIG. 5) and an output duty ratio of the inverter device 5, which is predetermined by a control software, may be used to detect an output voltage waveform of the inverter device 5. Alternatively, a combination of the DC voltage detection circuit 46 of the inverter device 5 and a pulse waveform detection circuit (not shown) may be used to detect an output voltage waveform of the inverter device 5. The output voltage waveform detected by either one of the above combinations may be compared through an active filter with a voltage signal from the voltage detection circuit 43 by the comparator 138.

As described above, according to the present embodiment, an inverter device can output a voltage synchronized precisely with a voltage of a commercial power supply system at the time of interconnection. Thus, stable operation of interconnection can be achieved.

In the above embodiments, a potential transformer is employed as the voltage detectors 32 and 33. However, the voltage detectors 32 and 33 may employ analog circuits for detection of the voltages.

Although certain preferred embodiments of the present invention have been shown and described in detail, it should be understood that various changes and modifications may be made therein without departing from the scope of the appended claims.

What is claimed is:

1. A power generating apparatus comprising:
    a power generator for generating alternating-current power;
    a driving source for driving said power generator;
    an inverter device for converting the alternating-current power into commercial alternating-current power;
    an interconnection switch for connecting an output of said inverter device with a commercial alternating-current power supply system;
    a first voltage detector for detecting a direct-current power supply voltage of said inverter device;
    a second voltage detector for detecting a full-wave rectification voltage of the commercial alternating-current power supply system; and
    an interconnection control part for closing said interconnection switch when the direct-current power supply voltage of said inverter device becomes equal to or exceeds the full-wave rectification voltage of the commercial alternating-current power supply system.

2. The power generating apparatus as recited in claim 1, further comprising a boost control part for boosting the direct-current power supply voltage of said inverter device so as to exceed the full-wave rectification voltage of the commercial alternating-current power supply system.

3. The power generating apparatus as recited in claim 1, wherein said driving source comprises a gas turbine engine.

4. The power generating apparatus as recited in claim 1, wherein said power generator comprises a permanent-magnet-type generator having a permanent magnet mounted on a circumferential surface of a rotor.

5. A method of operating a power generating apparatus, said method comprising:
    driving a power generator to generate alternating-current power;
    converting the alternating-current power into commercial alternating-current power by an inverter device;
    detecting a direct-current power supply voltage of the inverter device;
    detecting a full-wave rectification voltage of a commercial alternating-current power supply system; and
    connecting an output of the inverter device with the commercial alternating-current power supply system based on the direct-current power supply voltage of the inverter device and the full-wave rectification voltage of the commercial alternating-current power supply system.

6. A power generating apparatus comprising:
    a power generator for generating alternating-current power;
    a driving source for driving said power generator;
    an inverter device for converting the alternating-current power into commercial alternating-current power;
    an interconnection switch for connecting an output of said inverter device with a commercial alternating-current power supply system;
    a filter circuit connected between said inverter device and the commercial alternating-current power supply system, said filter circuit comprising a reactor and a capacitor;
    a first voltage detector for detecting an output voltage of said inverter device;
    an active filter connected to said first voltage detector, said active filter having simulated properties of said filter circuit;
    a second voltage detector for detecting a voltage of the commercial alternating-current power supply system; and
    an interconnection control part for closing said interconnection switch when an output of said active filter accords with an output of said second voltage detector.

7. The power generating apparatus as recited in claim 6, wherein said driving source comprises a gas turbine engine.

8. The power generating apparatus as recited in claim 6, wherein said power generator comprises a permanent-magnet-type generator having a permanent magnet mounted on a circumferential surface of a rotor.

9. A method of operating a power generating apparatus, said method comprising:
    driving a power generator to generate alternating-current power;
    converting the alternating-current power into commercial alternating-current power by an inverter device;
    detecting an output voltage of the inverter device;
    detecting a voltage of the commercial alternating-current power supply system;
    inputting the output voltage of the inverter device into an active filter having simulated properties of a filter circuit to generate a simulated output voltage of the filter circuit, said filter circuit being connected between the inverter device and the commercial alternating-current power supply system and comprising a reactor and a capacitor; and
    connecting an output of the inverter device with the commercial alternating-current power supply system when the simulated output voltage of the filter circuit accords with the voltage of the commercial alternating-current power supply system.

10. A power generating apparatus comprising:
    a power generator for generating alternating-current power;
    a driving source for driving said power generator;
    an inverter device for converting the alternating-current power into commercial alternating-current power;
    an interconnection switch for connecting an output of said inverter device with a commercial alternating-current power supply system;
    a filter circuit connected to said interconnection switch and disposed between said interconnection switch and the commercial alternating-current power supply system, said filter circuit comprising a reactor and a capacitor; and
    an interconnection control part for closing said interconnection switch to connect the output of said inverter device with the commercial alternating-current power supply system.

* * * * *